June 9, 1953 — C. A. SCHURR — 2,641,697

ELECTRONIC LIMIT CONTROL CIRCUIT

Filed Jan. 18, 1950

Inventor
CHARLES ALLAN SCHURR
By John H. Leonard
Harold J. Rathbun
his Attorneys

Patented June 9, 1953

2,641,697

UNITED STATES PATENT OFFICE 2,641,697

ELECTRONIC LIMIT CONTROL CIRCUIT

Charles Allan Schurr, Euclid, Ohio, assignor to The Electric Controller & Manufacturing Company, Cleveland, Ohio, a corporation of Ohio Application January 18, 1950, Serial No. 139,178

4 Claims. (Cl. 250—27)

This invention relates to a limit control circuit and more particularly to an improved limit control circuit including control means responsive to a change of flux distribution in an electromagnetic device, such as a transformer, resulting from relative movement or change in displacement between the device and an iron vane or armature.

Although it has many other uses, the present invention is especially advantageous for controlling the motor which drives a reciprocating machine element between limits. In order to increase the rate of production of many large reciprocating machines, the speed of the reciprocating element has been so increased that the usual track type limit switches or other limit switches requiring physical contact between the moving element and a switch operating lever are not able to withstand the repeated severe impacts. Many known limit control circuits responsive to a change in flux distribution or flux magnitude are not sensitive enough for such applications, particularly when the reciprocating element is very heavy and not accurately guided, because the path of travel of the moving machine element is often so erratic that it is necessary to maintain an excessive distance between the vane and the flux producing element. However, in some instances, the function of the track type limit switches has been successfully accomplished by a resonant limit control circuit comprising a capacitor connected in series with a series connected relay and reactor, the inductance of the reactor being varied by a change in the relative displacement between the reactor and a metal vane carried by the reciprocating machine element. Although this prior limit control circuit possesses many advantages, it requires a relatively large reactor and, because the relay current does not fall to zero, its sensitivity is not all that is desired. The large reactor and the lack of extreme sensitivity makes it difficult to use the prior circuit for the control of machine tools such as planers where only limited space is available and rapidly repeated operation is a requirement.

The illustrative limit control circuit described herein uses a loosely coupled transformer instead of a reactor as the flux producing element and uses a grid controlled electronic tube, preferably a gaseous discharge tube or thyratron, to control the relay current. The transformer can be much smaller than the reactor of the prior resonant limit control circuit and, if the tube is a thyratron, the relay operating current can be varied between zero and any desired higher value. The known prior electronic control circuits employing loosely coupled transformers which have been used for floor leveling operations of elevators are not suitable for use as limit switches on large industrial machines either because the circuits do not fail safe, are not sensitive enough, are too complicated, or use a type of transformer which is not suitable for controlling a sudden stopping operation without reversal.

In the illustrated embodiments of this invention, a relay is connected in the cathode-plate circuit of an electronic tube such as a grid-controlled gaseous discharge tube or thyratron. The cathode-grid voltage of the thyratron is the resultant of two alternating voltages which are substantially 180° out of phase with each other. One of the two voltages is fixed in phase and magnitude and is preferably supplied from a phase shifter. The other of the two voltages is the secondary voltage of a loosely coupled transformer having an exposed air gap. So long as an extraneous iron vane which may be carried by a machine element is away from the air gap, the two opposed voltages are equal, the resultant cathode-grid voltage of the thyratron is zero, and the thyratron conducts to maintain the relay closed.

In the preferred embodiment, the transformer voltage is approximately 180 degrees out of phase with the cathode-plate voltage of the thyratron and the fixed or constant voltage is approximately in phase with the cathode-plate voltage. When the iron vane enters the flux field of the exposed air gap, the flux distribution of the transformer is so altered that the secondary voltage increases. The resultant of the two voltages which is impressed between the cathode and the grid then has a value greater than zero and is approximately 180 degrees out of phase with the cathode-plate voltage. The thyratron thereupon stops conducting and the relay drops out. If a vacuum tube is used instead of a thyratron, the change in cathode-grid voltage upon entry of the vane into the flux field of the exposed air gap can obviously be made sufficient to reduce the cathode-plate current below the drop-out value of the relay.

In the other illustrated embodiment, the transformer voltage is approximately in phase with the cathode-plate voltage and the constant voltage is approximately 180 degrees out of phase with the cathode-plate voltage. The change in the flux distribution of the transformer upon entry of the iron vane into the air gap in this second embodiment is such as to cause a decrease in the transformer voltage. Because of the phase relationships of the voltages, the decreased transformer voltage causes the resultant cathode-grid voltage to increase and to be approximately 180 degrees out of phase with the cathode-plate voltage. Consequently, the thyratron stops conducting as in the other embodiment.

In both embodiments the relay is normally magnetically held in its operated position so that a failure of power or an open circuit to the relay winding causes the relay to drop out. Hence, both circuits are of the "fail safe" type. Furthermore, since the voltage which controls the conductivity of the tube is the resultant of two voltages supplied from a single source, usual variations in the voltage of the source have substantially no effect on the resultant voltage.

It is an object of this invention to provide an improved limit control circuit.

Another object is to provide an improved limit control circuit in which a relay responds to a voltage which varies in accordance with the position of a moving machine element.

Still another object is to provide a limit control circuit including control means responsive to a change in flux distribution of a flux producing device which circuit can be made very compact, which is responsive to relatively small changes in flux distribution, and which fails safe.

A further object is to provide a limit control circuit in which the conductivity of an electronic tube is controlled solely by a change in the magnitude of the cathode-grid potential.

A further object is to provide an improved limit control circuit in which an electronic tube is controlled by the resultant of a constant voltage and a voltage which varies in accordance with the position of a moving machine element.

An additional object is to provide an improved limit control circuit in which the cathode-grid voltage of an electronic tube is the resultant of a constant voltage and a voltage which varies in accordance with the position of an iron vane relative to the flux field of the exposed air gap of a loosely coupled transformer.

A more specific object is to provide a limit control circuit in which a control relay is responsive to the conductivity of an electronic tube controlled by a change in a cathode-grid voltage which is the resultant of a voltage fixed in phase and magnitude and a voltage substantially fixed in phase but which varies in magnitude in accordance with the relative position of an iron vane and the flux field of the exposed air gap of a loosely coupled transformer.

Other objects and advantages will become apparent from the following description wherein reference is made to the drawing, in which.

Figure 1:
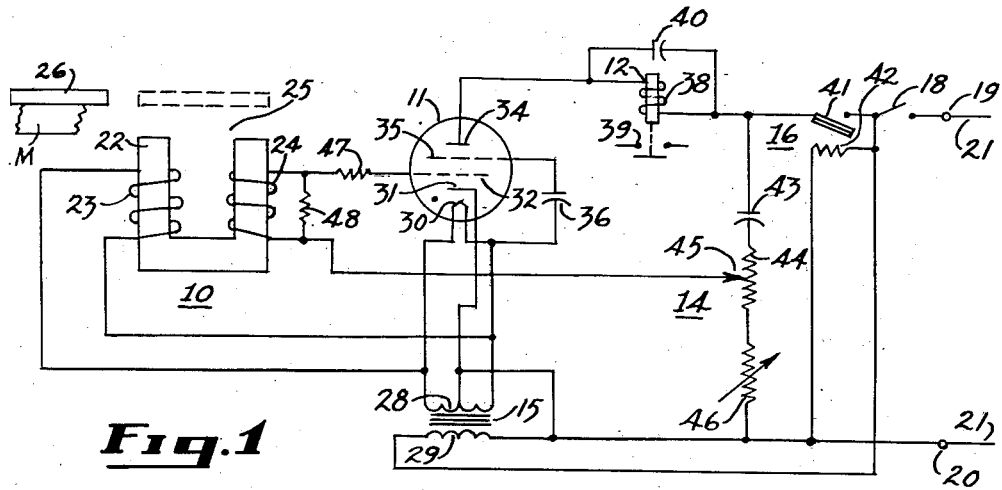
Fig. 1 is a wiring diagram of a preferred embodiment of the invention.

The limit control circuit as shown in the preferred embodiment of Fig. 1 comprises a source of variable voltage such as a loosely coupled transformer 10, a grid-controlled electronic tube 11 which is preferably a gaseous discharge tube or thyratron, an electromagnetic relay 12, a suitable phase shifter 14, a stepdown transformer 15, a thermal time delay relay 16, an off-on manual control switch 18, and a pair of supply terminals 19 and 20 for connecting the circuit to a suitable source of alternating current preferably of the usual power supply frequencies such as 25 or 60 cycles per second and represented by supply conductors 21.

Although any suitable voltage source having its output voltage variable in magnitude in accordance with the position of a moving machine element may be used to supply a variable voltage, the loosely coupled transformer 10 is especially desirable for this purpose. The transformer 10 has a C-shaped laminated core 22 one leg of which carries a primary winding 23 of a relatively small number of turns and the other leg of which carries a secondary winding 24 of a relatively large number of turns. The core 22 defines an exposed air gap 25 beyond the end faces of its legs which is adapted to be entered and traversed by a suitable magnetic armature or vane 26. The vane 26 may be carried by a reciprocating machine element M. When the vane 26 is out of the air gap 25, for example in the solid line position, the leakage flux of the primary winding 23 is relatively large and a relatively small voltage is induced in the secondary winding 24. On the other hand, when the vane 26 is in the air gap 25 as shown by the broken lines in Fig. 1, the primary leakage flux is materially reduced and a relatively large voltage is induced in the secondary winding 24. The transformer 10 preferably has a relatively large turn ratio so that its secondary voltage increases both materially and suddenly when the vane enters a predetermined distance into the air gap 25 beyond one leg of the core 22 toward the other leg. Although in the illustrated embodiment the vane 26 is shown as movable in the air gap 25 from one leg of the core 22 toward the other, it is obvious that the movement could be at right angles to the direction of movement shown or at any other desired angle.

It is to be noted that the air gap 25 into which the vane 26 enters is beyond the end faces of the legs of the core 22 and is not therebetween. Consequently, the path of the vane 26 need not be predetermined with great accuracy since it is only necessary that the vane 26, upon approaching the core 22, clear the end faces of the legs on the one hand and, on the other hand, not be so far therefrom as to render the resulting voltage change insufficient to perform the desired control function. It has been found that satisfactory operation results even when the path of the vane 26 is as far as four inches from the core 22.

The primary winding 23 may be supplied with a relatively low voltage from a secondary winding 28 of the transformer 15 which has its primary winding 29 connected across the terminals 19 and 20 when the switch 18 is closed. The secondary winding 28 also supplies a heater 30 for a cathode 31 of the thyratron 11 which also has a control electrode or grid 32, a plate 34, and preferably a second control electrode or shield grid 35. The shield grid 35 is connected to a terminal of the secondary winding 28 through a capacitor 36 for a purpose to be described, and the cathode 31 is connected to a center tap of the secondary winding 28 and to the terminal 20.

The plate 34 is connected in a plate circuit to the terminal 19 through an operating winding 38 of the relay 12 when the time delay relay 16 and the switch 18 are both closed. The relay 12 may have any desired arrangement and number of contacts, but only normally open contacts 39 are shown. Suitable means, such as a capacitor 40 connected in parallel with the winding 38, may be provided to insure positive hold-in of the relay 12 when its winding 38 is supplied by the pulsating direct current passed by the thyratron 11.

The time delay relay 16 permits the cathode 31 to reach operating temperature before the plate circuit is closed, and to this end may comprise a bimetallic contact element 41 arranged to complete the plate circuit when heated by a heater 42 connected across the terminals 19 and 20 whenever the switch 18 is closed.

When the switch 18 and the contact element 41 are both closed, the phase shifter 14 is connected across the terminals 19 and 20. The phase shifter 14 may be of any suitable type and as shown comprises a capacitor 43, a resistor 44 having an adjustable tap 45, and a variable resistor 46 all connected in series. The secondary winding 24 of the transformer 10 is connected between the adjustable tap 45 and the grid 32 in series with a resistor 47 of relatively large value. If desired, a resistor 48 may be connected in parallel with the winding 24.

Further understanding of the embodiment of Fig. 1 may be had from the following description of its operation. With the terminals 19 and 20 connected to the suitable source of alternating current represented by the conductors 21, closure of the switch 18 completes a circuit through the heater 42 and causes energization of the primary winding 29 of the transformer 15 which supplies the heater 30. After the cathode 31 has reached a safe operating temperature, the bimetallic contact element 41 closes to complete the cathode-plate circuit from the terminal 20 through the cathode 31, the plate 34, the relay winding 38, the contact element 41, and the switch 18 to the terminal 19.

Energization of the primary winding 29 of the transformer 15 causes energization of the primary winding 23 of the transformer 10. If the vane 26 is not in the air gap 25, the primary leakage flux of the transformer 10 is relatively large and the voltage induced in the secondary winding 24 is relatively low. The tap 45 is so adjusted along the resistor 44 and the resistance of the resistor 46 is so selected that the voltage between the terminal 20 and the tap 45 is equal to the relatively low voltage now existing between the lower and upper terminals of the secondary winding 24 and is 180° out of phase therewith.

Figure 3:
Fig. 3 and Fig. 4 are vector diagrams illustrating the operation of the preferred embodiment.

The foregoing voltage relationships are illustrated in Fig. 3. The voltage vector $E_p$ represents the voltage between the cathode 31 and the plate 34 or between the terminals 20 and 19, the voltage vector $E_c$ represents the constant voltage between the terminal 20 and the tap 45, and the voltage vector $E_v$ represents the voltage between the lower and upper terminals of the secondary winding 24 when the vane 26 is out of the air gap 25. The voltage $E_v$ lags the voltage $E_p$ by nearly 180° and the voltage $E_c$ is made to lead the voltage $E_p$ sufficiently so that it is substantially 180° out of phase with the voltage $E_v$. Since the grid 32 is connected to the cathode 31 through the winding 24, the tap 45, the lower portion of the resistor 44 and the resistor 46, and since the voltages $E_c$ and $E_v$ are equal to and 180° out of phase with each other, the grid 32 and cathode 31 are maintained at the same potential. That is, the cathode-grid voltage is zero since it is the resultant of the voltage drop across the resistance of lower portion of the phase shifter 14 and the secondary voltage of the transformer 10 which two voltages are equal to each other and in phase opposition. With zero grid voltage, the thyratron 11 conducts alternate half-cycles of current and this pulsating direct current in the cathode-plate circuit maintains the relay 38 energized so that the contacts 39 are closed.

Figure 4:
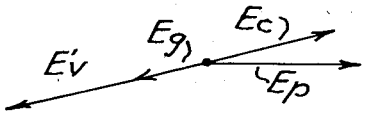

If now the vane 26 enters the air gap 25, part of the primary leakage flux becomes an active flux linking the secondary winding 24 and the secondary voltage of the transformer 10 increases materially with negligible shift in phase. This increase in the secondary voltage of the transformer 10 from the value $E_v$ in Fig. 3 to the value $E'_v$ in Fig. 4 causes a resultant grid voltage $E_g$ shown in Fig. 4 which is approximately 180° out of phase with the plate voltage $E_p$. Under these conditions, the grid 32 is negative with respect to the cathode when the plate 34 is positive, and the thyratron 11 ceases to conduct and the relay 12 drops out to open the contacts 39.

Due to the loose coupling of the transformer 10, a third harmonic voltage may be present in the winding 24. This third harmonic voltage leads the plate voltage, that is, it starts to rise in a positive direction slightly before the plate voltage becomes positive. By using a thyratron with a shield grid 35, the effect of the third harmonic voltage on the conductivity of the thyratron 11 may be eliminated by impressing a small voltage on the shield grid 35 which is negative at the instant the plate becomes positive as by connecting the shield grid 35 to the right hand terminal of the winding 23 through the capacitor 36.

Figure 2:
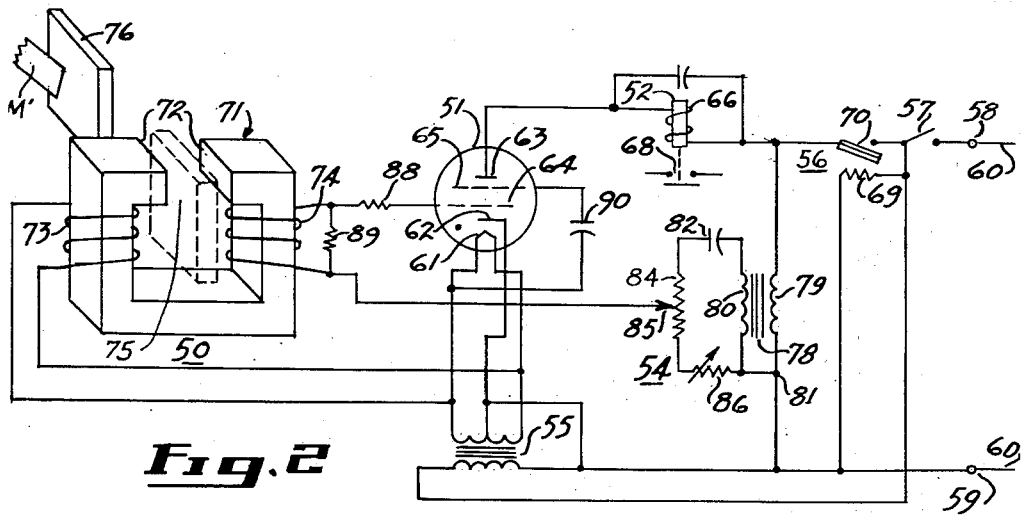
Fig. 2 is a wiring diagram of a modification.

One of the principal advantages of the limit control circuit of Fig. 1 is that the path of the vane 26 need not be accurately predetermined because it is not necessary for it to enter a slot or confined space between legs of a transformer core. An additional advantage of the circuit of Fig. 1 is that the phase shifter 14 may be of a very simple, compact, and inexpensive type. In the embodiment of Fig. 2 the path of the vane must be more accurately determined and a somewhat more complex phase-shifter must be used.

The embodiment of the limit control circuit shown in Fig. 2 comprises a loosely coupled transformer 50, a grid-controlled electronic tube such as the gaseous discharge tube or thyratron 51, an electromagnetic relay 52, a suitable phase shifter 54, a step-down transformer 55, a thermal time delay relay 56, an off-on manual control switch 57, and a pair of supply terminals 58 and 59 for connecting the circuit to a suitable source of alternating current represented by the supply conductors 60.

The thyratron 51, the relay 52, the transformer 55, the time delay relay 56, the switch 57, and the source 60 may be the same as similar parts of the limit control circuit of Fig. 1 and are arranged in the circuit of Fig. 2 in a similar manner. The thyratron 51 has a cathode heater 61, a cathode 62, a plate 63, a control electrode or grid 64, and a shield grid 65. The relay 52 has an operating winding 66 and may have normally open contacts 68. A heater 69 for the time delay relay 56 controls the closure of a bi-metallic contact element 70.

The transformer 50 preferably has a substantially C-shaped laminated core 71 with pole extensions having faces 72 directed toward each other. One leg of the core 71 carries a primary winding 73 of a relatively few turns and the other leg carries a secondary winding 74 of a relatively large number of turns. A housing for the transformer 50 is not shown, but preferably it is arranged in an obvious manner to define an open space or slot between the pole faces 72 thereby to define an air gap 75 adapted to be entered by a suitable magnetic vane 76 which may be carried by a reciprocating machine element M'. When the vane 76 is out of the air gap 75, for example in the solid line position, a relatively large amount of the flux produced by the primary winding 73 passes through the leg on which the secondary winding 74 is wound and the voltage induced in the winding 74 is relatively large. On the other hand, when the vane 76 is in the air gap 75 or between the two pole faces 72 as shown by the broken lines in Fig. 2, a considerable portion of the primary flux is shunted from the winding 74 and a relatively small voltage is induced therein.

When the switch 57 and the time delay relay 56 are both closed, the phase-shifter 54 is connected across the terminals 58 and 59. The phase shifter 54 may be of any suitable type and as shown comprises a transformer 78 having a primary winding 79 and a secondary winding 80. The windings 79 and 80 have a common terminal 81 connected to the supply terminal 59. The secondary winding 80 is connected in a closed loop circuit including a capacitor 82, a resistor 84 having an adjustable tap 85, and a variable resistor 86 all connected in series. By properly selecting the resistance of the resistor 86 and adjusting the tap 85 along the resistor 84, the phase of the voltage between the terminal 59 and the tap 85 can be made to be approximately 180° out of phase with the voltage between the terminals 59 and 58 and substantially equal to the relatively high voltage which appears at the secondary winding 74 when the vane 76 is out of the air gap 75.

Further understanding of the embodiment of Fig. 2 may be had from the following description of its operation. With the terminals 58 and 59 connected to the suitable source of alternating current represented by the conductors 60, closure of the switch 57 completes a circuit through the heater 69 of the time delay relay 56 and energizes the primary winding of the transformer 55 which supplies the cathode heater 61. After the cathode 62 has reached a safe operating temperature, the bimetallic contact element 70 closes to complete the cathode-plate circuit from the terminal 59 through the cathode 62, the plate 63, the relay winding 66, the contact element 70, and the switch 57 to the terminal 58.

Energization of the primary winding of the transformer 55 causes energization of the primary winding 73 of the transformer 50. If the vane 76 is not in the air gap 75, the voltage induced in the secondary winding 74 is relatively high. The tap 85 is so adjusted along the resistor 84 and the resistance of the resistor 86 is so selected that the voltage between the terminal 59 and the tap 85 is equal to the voltage now existing between the lower and upper terminals of the secondary winding 74 and is 180° out of phase therewith.

Figure 5:
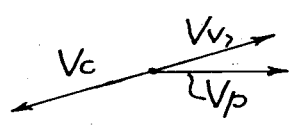
Figs. 5 and 6 are vector diagrams illustrating the operation of the embodiment of Fig. 2.

The foregoing voltage relationships are illustrated in Fig. 5. The voltage vector $V_p$ represents the voltage between the cathode 62 and the plate 63 or between the terminals 59 and 58, the voltage vector $V_c$ represents the constant voltage between the terminal 59 and the tap 85, and the voltage vector $V_v$ represents the voltage at the secondary winding 74 when the vane 76 is not in the air gap 75. The voltage $V_v$ leads the voltage $V_p$ by a few degrees and the voltage $V_c$ is made to lag the voltage $V_p$ by nearly 180° or so that it is substantially 180° out of phase with the voltage $V_v$. Since the control grid 64 is connected to the cathode 62 through the winding 74, the tap 85, the lower portion of the resistor 84, and the resistor 86, and since the voltages $V_c$ and $V_v$ are equal to each other and 180° out of phase, the grid and cathode are maintained at the same potential. That is, the cathode-grid voltage is zero since it is the resultant of the voltage drop between the tap 85 and the terminal 59 and the voltage at the secondary winding 74. With zero grid voltage, the thyratron 51 conducts alternate half-cycles of the current supplied from the terminals 58 and 59 to the plate-cathode circuit maintaining the relay 52 energized and the contacts 68 closed.

Figure 6:
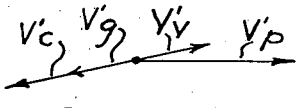

If now the vane 76 enters the air gap 75, part of the primary flux of the transformer 50 is shunted from the leg on which the secondary winding 74 is wound to cause the secondary voltage to decrease materially and suddenly with negligible shift in phase. This decrease in the secondary voltage of the transformer 50 from the value $V_v$ in Fig. 5 to the value $V'_v$ in Fig. 6 causes a resultant grid voltage $V_g$ shown in Fig. 6 which is approximately 180° out of phase with the plate voltage $V_p$. Under these conditions the grid 64 is negative with respect to the cathode 62 when the plate 63 is positive, and the thyratron ceases to conduct and the relay winding 66 is deenergized resulting in opening of the contacts 68.

Resistors 88 and 89 corresponding to the resistors 47 and 48 of Fig. 1 may be included in the circuit of Fig. 2 if desired, and a capacitor 90 may be connected between the shield grid 65 and the left-hand terminal of the secondary winding of the transformer 55 to eliminate the effect of any third harmonic voltage which may appear at the grid 62.

An example of a combination of resistors, circuit values, and a tube which gives very satisfactory operation of the embodiment of Fig. 1 is set forth in the following table, but is not to be considered as limiting the scope of this invention from that set forth in the annexed claims:

Transformer 10—normal voltage ratio of 6.3 to 70 with a turns ratio of 1 to 47 and normally operating at about 10,000 to 15,000 lines/in.$^2$.
Tube 11—GL 2050 shield grid thyratron.
Transformer 15—voltage ratio of 115 to 6.3 for filament supply service.
Resistor 44—adjustable from 1800 ohms to 4050 ohms.
Resistor 46—adjustable from 3300 ohms to 4800 ohms.
Resistor 47—47,000 ohms.
Resistor 48—510,000 ohms.
Capacitor 36 and 43—0.5 microfarad.
Voltage across secondary winding 24 with vane out of air gap—70 volts.
Voltage at terminals 19 and 20—115 volts at 60 cycles/sec. with usual variations therefrom.

The sensitivity of the embodiment of Fig. 1 may be increased if desired by increasing the turn ratio of the transformer 10. Since this would result in a larger voltage at the winding 24 when the vane 26 is out of the air gap 25, an increase in turn ratio may require that the source 21 have a larger voltage so that the resultant grid voltage can be made equal to zero or a transformer may be added to the phase shifter 14 to provide the higher voltage. Similarly, the sensitivity of the embodiment of Fig. 2 may be increased.

It should be noted that, in both embodiments of the invention, the control relay is normally energized and is deenergized only to perform a control function which might be the stopping of a machine element at a predetermined limit of travel. Should there be a power failure or any other mishap causing failure of the current supply to the relay, the relay opens its contacts and the system is therefore of the "fail safe" type. Since the limit control circuit fails safe, it may be used in the same manner as the resonant limit control circuit disclosed in the copending application of Asa H. Myles, Serial No. 104,575, filed July 13, 1949, now United States Patent No. 2,636,156, dated April 21, 1953.

Having thus described my invention, I claim:

1. A control circuit comprising a gaseous electronic tube having a grid, cathode, and plate, means connecting said cathode and plate in a plate circuit, means for connecting said plate circuit to a source of alternating voltage to provide a cathode-plate voltage between said cathode and plate, and electro-responsive device in said plate circuit responsive to the conductivity of said tube, a transformer having a primary winding arranged to be supplied with an alternating voltage from said source and having a secondary winding, said transformer having a core common to said primary and secondary windings and providing a flux path exposed for entry by a relatively movable iron vane, whereby the degree of electromagnetic coupling between said primary and secondary windings is varied upon relative movement of the vane into and out of said path and the secondary voltage induced in said secondary winding thereby lags the primary voltage by an angle materially less than 180° and has a magnitude dependent upon the relative position of said vane and flux path, a phase shifting means arranged to be supplied from a source of alternating voltage and, when so supplied, being operative to provide a substantially constant alternating voltage capable of being placed substantially 180° out of phase with said secondary voltage, circuit means so interconnecting said phase shifting means and said secondary winding that said constant voltage is substantially 180° out of phase with said secondary voltage thereby to produce a resultant alternating voltage substantially equal to the arithmetical difference between said opposed voltages, said circuit means including means operative to impress said resultant alternating voltage between the grid and cathode of said tube, with one of its components at least approximately in phase with said cathode-plate voltage, for controlling the conductivity thereof, and said core being formed to so define said flux path that the entry of the vane thereinto changes the active flux of the transformer to cause said resultant alternating voltage to increase in a direction such that said increased resultant alternating voltage is at least approximately in phase opposition to said cathode-plate voltage, whereby the conductivity of said tube may be controlled in accordance with the relative position of said vane and said flux path.

2. The control circuit of claim 1 characterized in that said one component is said constant voltage and said change in the active flux is a change causing an increase in said secondary voltage.

3. The control circuit of claim 1 characterized in that said one component is said secondary voltage and said change in the active flux is a change causing a decrease in said secondary voltage.

4. The limit control circuit of claim 1 characterized in that said phase shifting means includes means operative to render said constant alternating voltage substantially equal to the value of said secondary voltage when said vane is out of said flux path.

CHARLES ALLAN SCHURR.

References Cited in the file of this patent

UNITED STATES PATENTS

| Number | Name | Date |
|--------|------|------|
| 2,229,449 | Garman | Jan. 21, 1941 |
| 2,255,526 | Lassen | Sept. 9, 1941 |
| 2,333,446 | Rogers | Nov. 2, 1943 |
| 2,439,711 | Bovey | Apr. 13, 1948 |